(12) United States Patent
Xu et al.

(10) Patent No.: US 10,437,471 B2
(45) Date of Patent: Oct. 8, 2019

(54) METHOD AND SYSTEM FOR ALLOCATING AND MANAGING STORAGE IN A RAID STORAGE SYSTEM

(71) Applicant: EMC IP Holding Company LLC, Hopkinton, MA (US)

(72) Inventors: Xinlei Xu, Beijing (CN); Jian Gao, Beijing (CN); Lifeng Yang, Beijing (CN); Ruiyong Jia, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/623,442

(22) Filed: Jun. 15, 2017

(65) Prior Publication Data

US 2017/0364270 A1    Dec. 21, 2017

(30) Foreign Application Priority Data

Jun. 16, 2016   (CN) .......................... 2016 1 0428405

(51) Int. Cl.
*G06F 3/06* (2006.01)
*G06F 11/20* (2006.01)
*G06F 12/12* (2016.01)
*G06F 13/16* (2006.01)

(52) U.S. Cl.
CPC ............ *G06F 3/0604* (2013.01); *G06F 3/061* (2013.01); *G06F 3/0631* (2013.01); *G06F 3/0685* (2013.01); *G06F 3/0688* (2013.01); *G06F 11/20* (2013.01); *G06F 12/12* (2013.01); *G06F 13/16* (2013.01)

(58) Field of Classification Search
CPC .... G06F 3/0614; G06F 3/0631; G06F 3/0688; G06F 3/0689; G06F 11/2023; G06F 11/2028; G06F 3/0604; G06F 3/061; G06F 3/0685
See application file for complete search history.

(56) References Cited

U.S. PATENT DOCUMENTS

| | | | |
|---|---|---|---|
| 2011/0238938 A1* | 9/2011 | Kloeppner | G06F 3/0611 711/162 |
| 2012/0311246 A1* | 12/2012 | McWilliams | G06F 12/0284 711/103 |

(Continued)

*Primary Examiner* — Than Nguyen
(74) *Attorney, Agent, or Firm* — Brian J. Colandreo; Mark H. Whittenberger; Holland & Knight LLP (57) ABSTRACT

Embodiments of the present invention relate to a method and system for managing a memory in a storage system. In one embodiment of the present invention, there is provided a method for managing a memory in a storage system. The storage system comprises a first controller, a first memory and a first additional memory that is coupled to the first controller. The method comprises: in response to an access request on the storage system from the first controller hitting the first memory, allocating a storage space in the first additional memory; writing data associated with the access request in the first memory to the storage space allocated in the first additional memory; and serving the access request via the storage space allocated in the first additional memory. In another embodiment of the present invention there is further proposed a system for managing a memory in a storage system.

20 Claims, 8 Drawing Sheets

(56) References Cited

U.S. PATENT DOCUMENTS

| | | | |
|---|---|---|---|
| 2014/0025913 A1* | 1/2014 | Fuente | G06F 11/1484 711/162 |
| 2014/0047263 A1* | 2/2014 | Coatney | G06F 11/2023 714/4.11 |
| 2014/0108858 A1* | 4/2014 | Soran | G06F 3/0608 714/6.24 |
| 2015/0012699 A1* | 1/2015 | Rizzo | G06F 12/0866 711/113 |
| 2015/0143164 A1* | 5/2015 | Veerla | G06F 11/167 714/6.3 |

* cited by examiner

(12) United States Patent
US 10,437,471 B2

METHOD AND SYSTEM FOR ALLOCATING AND MANAGING STORAGE IN A RAID STORAGE SYSTEM

RELATED APPLICATIONS

This application claim priority from Chinese Patent Application Number CN201610428405.4, filed on Jun. 16, 2016 at the State Intellectual Property Office, China, titled "METHOD AND SYSTEM FOR MANAGING MEMORY IN STORAGE DEVICE" the contents of which is herein incorporated by reference in its entirety.

FIELD

Various embodiments of the present invention relate to storage management, and more specifically, to a method and system for managing a memory in a storage system (e.g. Redundant Array of Independent Disks, RAID).

BACKGROUND

With the development of data storage techniques, various data storage devices now provide users with higher data storage capacity, and also their speed of accessing data has been increased greatly. Besides the increase of data storage capacity, users also impose greater demands on data reliability and response time of storage systems. So far various RAID-based data storage systems have been developed to increase data reliability. When one or more disks in a storage system fail, data in failing disks can be recovered from data in other disks operating normally.

The storage system may be accessed via storage control nodes. In a typical active-active (also referred to as dual active) type of storage system, two storage control nodes work jointly to process data access operations on the storage system and further provide higher availability and better performance. Each storage control node has its own memory (e.g. cache), and memories in two storage controllers operate in a mirroring mode. The two storage control nodes may concurrently receive data access instructions from the outside. At this point, it becomes a focus of research regarding how to manage memories in the two storage control nodes and further reduce the response time of data access operations.

SUMMARY

Therefore, it is desirable to develop and implement a technical solution for effectively managing a memory in a storage system and further improving access performance of the storage system. It is desired that the technical solution can be compatible with existing storage systems and manage memories in the storage system with higher efficiency without adding any extra hardware device to existing storage systems.

In one embodiment of the present invention, there is proposed a method for managing a memory in a storage system. The storage system comprises a first controller, a first memory and a first additional memory that is coupled to the first controller. The method comprises: in response to an access request on the storage system from the first controller hitting the first memory, allocating a storage space in the first additional memory; writing data associated with the access request in the first memory to the storage space allocated in the first additional memory; and serving the access request via the storage space allocated in the first additional memory.

In one embodiment of the present invention, there is proposed an apparatus for managing a memory in a storage system. The storage system comprises a first controller, a first memory and a first additional memory that is coupled to the first controller. The apparatus comprises: an allocating module configured to, in response to an access request on the storage system from the first controller hitting the first memory, allocate a storage space in the first additional memory; a writing module configured to write data associated with the access request in the first memory to the storage space allocated in the first additional memory; and a serving module configured to serve the access request via the storage space allocated in the first additional memory.

In one embodiment of the present invention, there is proposed a system for managing a memory in a storage system. The system comprises: one or more processors; a memory coupled to at least one processor of the one or more processors; computer program instructions stored in the memory which, when executed by the at least one processor, cause the system to execute a method for managing a memory in a storage system. The method comprises: in a storage system comprising a first controller, a first memory and a first additional memory that is coupled to the first controller, in response to an access request on the storage system from the first controller hitting the first memory, allocating a storage space in the first additional memory; writing data associated with the access request in the first memory to the storage space allocated in the first additional memory; and serving the access request via the storage space allocated in the first additional memory.

With the technical solution of the present invention, memories in storage control nodes may be managed effectively, response time of a storage system may be decreased, and further access efficiency of the storage system may be improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
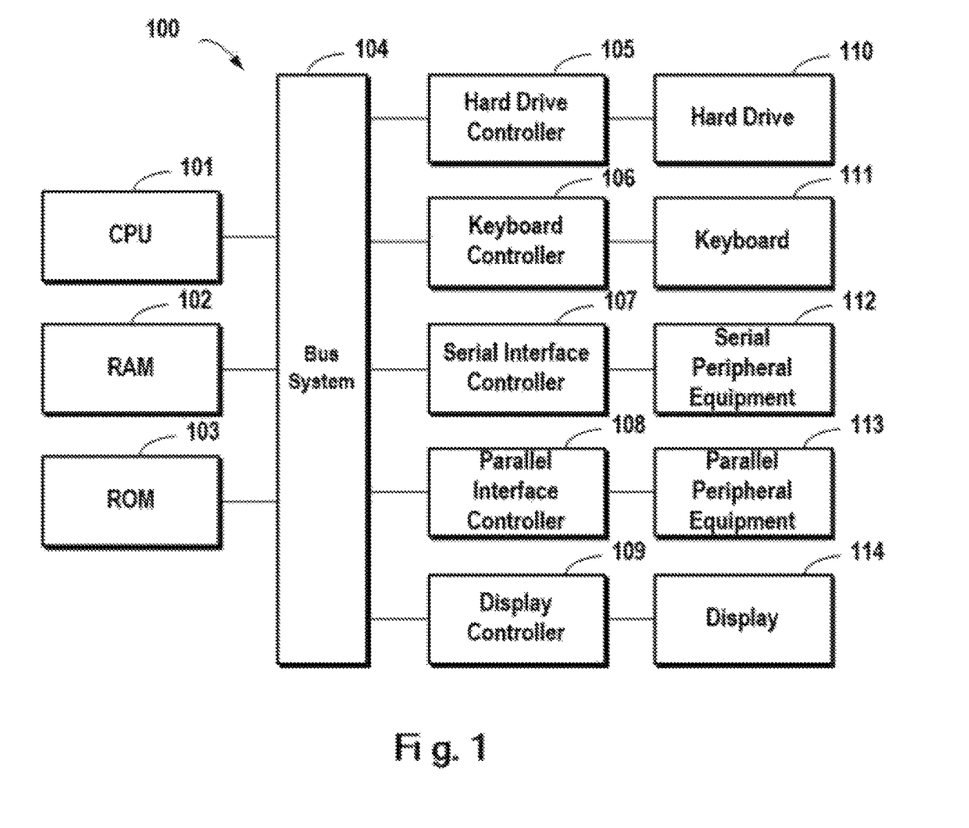
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101. RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Description is presented below to specific implementation of the various embodiments of the present invention by taking RAID as an example of storage systems. RAID may combine multiple storage devices into an array of disks. By providing redundant storage devices, reliability of an entire disk group is caused to significantly exceed a single storage device. RAID may offer a variety of advantages over a single storage device, for example, enhancing data integrity, enhancing fault tolerance, increasing throughput or capacity, etc. With the development of storage devices, RAID has gone through a number of standards, such as RAID-1, RAID-10, RAID-3, RAID-30, RAID-5, RAID-50, etc. The operating system may regard a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent where some disks crash.

Figure 2:
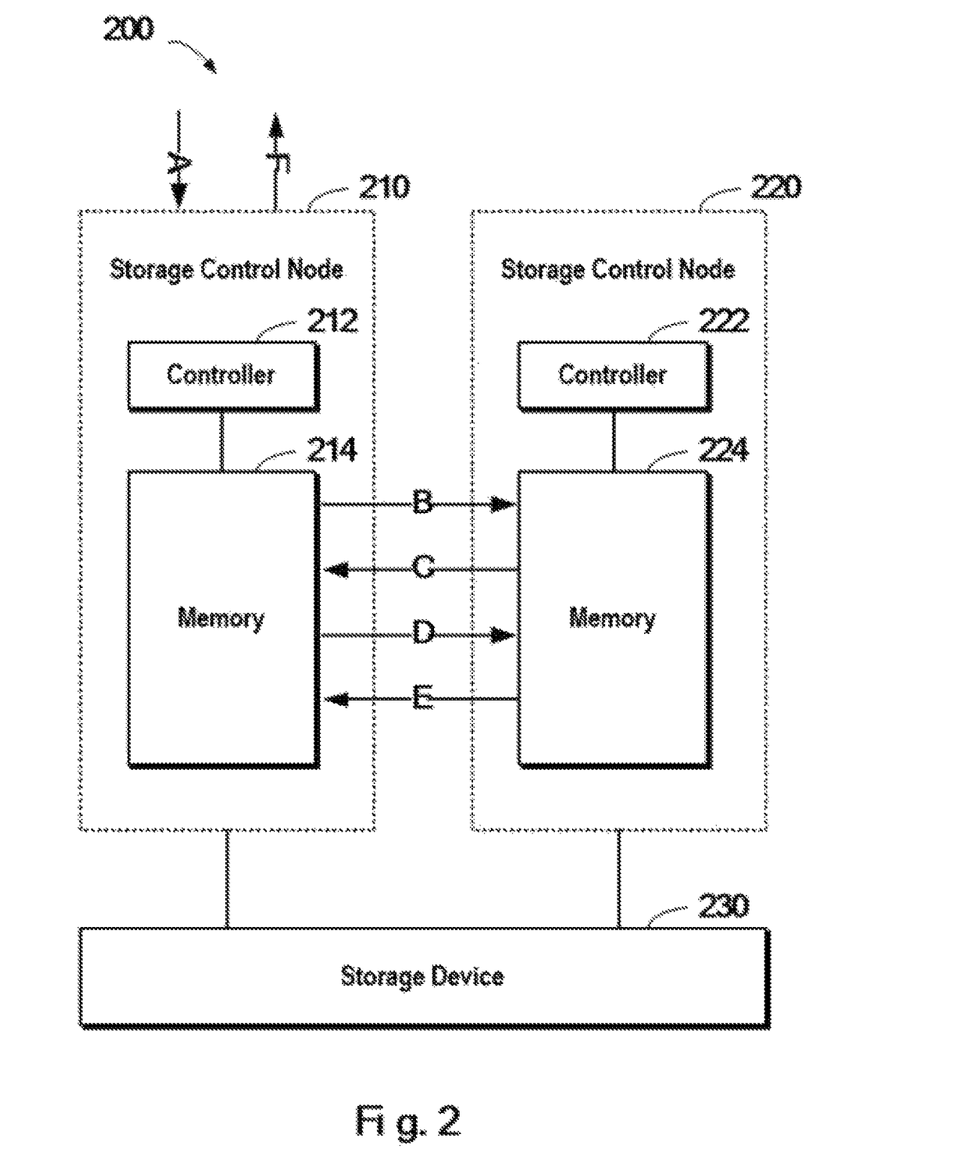
FIG. 2 schematically illustrates a schematic view for managing a memory in a storage system according to one technical solution.

FIG. 2 schematically illustrates a structural schematic view of a method for managing a memory in a storage system 200 according to one technical solution. As shown in FIG. 2, the storage system 200 may provide data access service to the outside via one or more storage control nodes. In this example, the storage system 200 may comprise storage control nodes 210 and 220. During operation of the storage system 200, the two storage control nodes 210 and 220 may provide service to the outside in parallel. If one node fails, then the other node may continue working.

The storage control node 210 may comprise a controller 212 and a memory 214 (e.g. cache). When the storage control node 210 receives a data access request from an external host, the controller 212 handles the request and looks up in the memory 214 to determine whether data associated with the request has been loaded to the memory 214 or not. If associated data has been loaded (hit), then the control node 210 may continue executing the data access request; if no associated data exists in the memory 214 (miss), then a corresponding available storage space has to be allocated in the memory 214 for executing the request.

Similarly, the other storage control node 220 also comprises a controller 222 and a corresponding memory 224, and operates in a manner similar to the storage control node 210. The two storage control nodes 210 and 220 may operate in parallel for handling different access requests. Note the memories 214 and 224 shown in FIG. 2 are mirrored memories, and data in corresponding mirrored pages comprised in the two memories corresponds to each other. Specifically, if the controller 210 modifies data in storage page A (status of which storage page is "dirty") in the memory 214 during processing the write operation, then content of the "dirty" data needs to be duplicated to the mirrored page A' in the other memory 224 which corresponds to storage page A, so as to ensure the consistency of data in the two memories 214 and 224.

The two memories 214 and 224 in the storage system 200 are mirrored memories, and the two controllers 212 and 222 may simultaneously respond to access hosts from the outside. As shown in FIG. 2, as indicated by arrow A, the storage control node 210 receives an access request (e.g., write request) from an external host, and subsequently allocates a storage space in the memory 214 to serve the access request. In the example as shown in FIG. 2, as the memories 214 and 224 are mirrored memories, the memory 214 has to send a message to the memory 224 to notify information on metadata in the allocated storage space (as indicated by arrow B), and subsequently the memory 224 needs to return acknowledgement information to the memory 214 (as indicated by arrow C). Later, in a step as indicated by arrow D, data associated with the access request needs to be copied between the memories 214 and 224 so as to ensure data matching between these two memories. Finally, only after a copy completion message is received at the memory 214 (as indicated by arrow E), will an acknowledgement on access request completion be returned to the external host.

According to the technical solution shown in FIG. 2, data communication between the two memories 214 and 224 (e.g., as indicated by arrows B to E) and especially data copy in steps D to E will take much time, which causes the external host to wait for a longer time. Therefore, it becomes a research focus regarding how to lower the amount of data transmission between the two memories 214 and 224 and further reduce the wait time.

Figure 3:
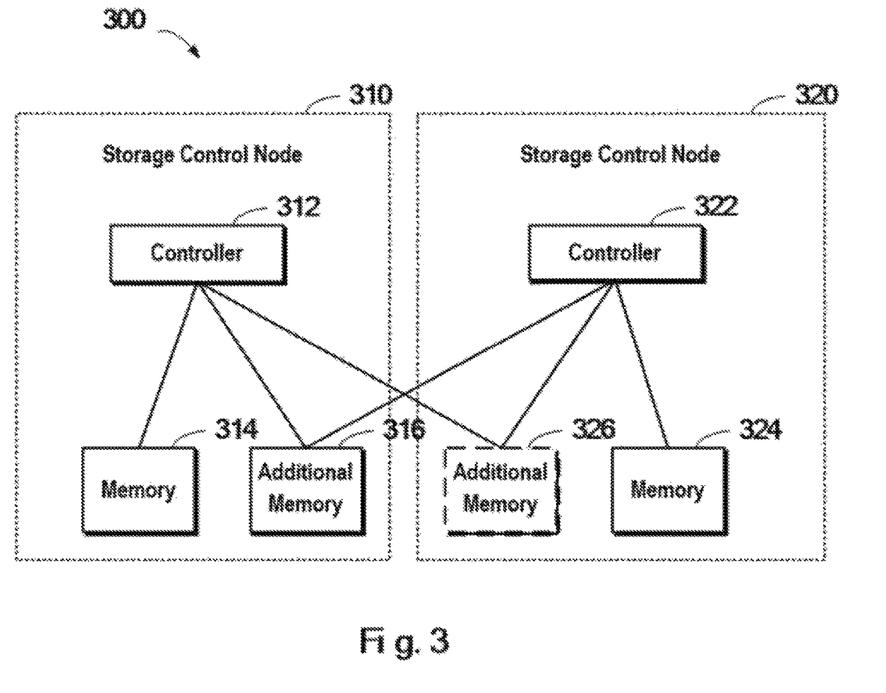
FIG. 3 schematically illustrates an architecture view of a method for managing a memory in a storage system according to one embodiment of the present invention.

In one embodiment of the present invention, there is proposed a technical solution for managing a memory in a storage system. Specifically, an additional memory is disposed in a storage control node and connected to a controller in the storage control node. Specifically, FIG. 3 schematically shows an architecture view of a method for managing a memory in a storage system 300 according to one embodiment of the present invention. As shown in FIG. 3, the storage system 300 comprises storage control nodes 310 and 320, wherein a controller 312 is coupled to a memory 314 and an additional memory 316.

In the example shown in FIG. 3, the memory may be a dynamic random access memory (DRAM), and the additional memory 316 may be a non-volatile random access memory (NVRAM). The additional memory 316 may be connected to the controller 312 via a bridge device (e.g., PCIE switch) and may further be coupled to a controller 322 in the storage control node 320. Likewise, the controller 322, an additional memory 326 and a memory 324 in the storage control node 320 may be connected in a manner similar to the storage control node 310. Details are omitted here.

Note according to the architecture as shown in FIG. 3, the additional memory 316 is coupled to both the controllers 312 and 322, so the controller 322 can directly access data in the additional memory 316 where necessary. The storage control node 310 receives an access request from a host and allocates a storage space in the additional memory 316 to serve the access request, so only metadata about the allocated storage space may be transmitted between the two storage control nodes 310 and 320, rather than actually executing the data copy. In other words, according to the technical solution of the present invention, the data copy steps as indicated by arrows D to E in FIG. 2 may be omitted, and further the wait time may be decreased significantly.

Those skilled in the art may appreciate that FIG. 3 shows the additional memory 326 in a dashed block, which indicates the additional memory 326 is an optional device. In other words, in one embodiment both the additional memories 316 and 326 may be disposed, while in another embodiment only the additional memory 316 may be disposed. Further, it should be understood although in FIG. 3 the additional memory 316 is disposed inside the storage control node 310 for the sake of access efficiency, in other embodiments the additional memory 316 may further be disposed outside the storage control node 310 so long as the controller 312 can access the additional memory 316.

Based on the architecture as shown in FIG. 3, one embodiment of the present invention proposes a method for managing a memory in a storage system. The storage system comprises a first controller, a first memory and a first additional memory that is coupled to the first controller. The method comprises: in response to an access request on the storage system from the first controller hitting the first memory, allocating a storage space in the first additional memory; writing data associated with the access request in the first memory to the storage space allocated in the first additional memory; and serving the access request via the storage space allocated in the first additional memory.

Figure 4:
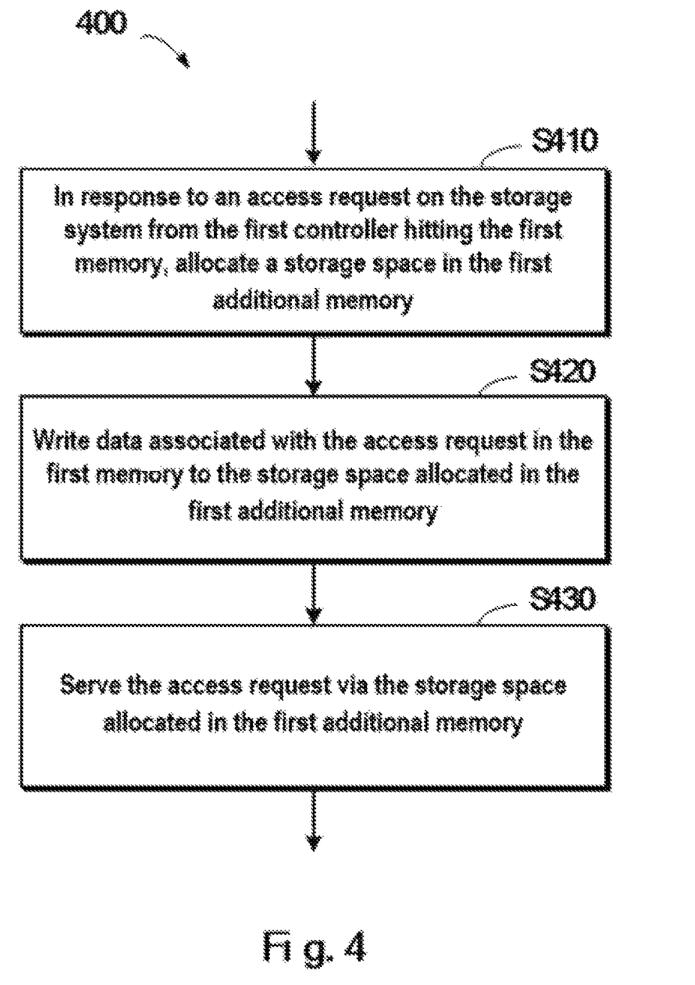
FIG. 4 schematically illustrates a flowchart of a method for managing a memory in a storage system according to one embodiment of the present invention.

Specific details of the embodiments of the present invention will be described below by taking the storage control node 310 shown in FIG. 3 as the main body that executes various steps of the embodiments of the present invention. FIG. 4 schematically shows a flowchart 400 of a method for managing a memory in a storage system according to one embodiment of the present invention.

In step S410, in response to an access request on the storage system from the first controller hitting the first memory, a storage space is allocated in the first additional memory. Since dirty data will lead to the data copy as shown in steps D to E in FIG. 2, the embodiments of the present invention endeavor to avoid the presence of dirty data in the memory 314. To this end, when the access request hits the first memory (e.g., the memory 314 shown in FIG. 3), a storage space is allocated in the first additional memory (e.g., the additional memory 316 shown in FIG. 3) to serve the access request, thereby avoiding the need to copy data to the memory in the other storage control node when using the first memory.

In step S420, data associated with the access request in the first memory is written to the storage space allocated in the first additional memory. In this step, the controller 312 as shown in FIG. 3 writes data associated with the access request in the memory 314 to the storage space allocated in the additional memory 316. At this point, since the additional memory 316 may be simultaneously accessed by the controllers 312 and 322, there is no need to perform data copy between the memories 314 and 316, and further the wait time may be decreased.

Note since the memory 314, the additional memory 316 and the controller 312 each are located within the storage control node 310, and the memory 314 and the additional memory 316 are both coupled to the controller 312, the speed of data write in step $420 is far faster that of data copy between the memories 314 and 324 (the memories 314 and 324 are located at the storage control nodes 310 and 320 respectively, so the speed of data copy is slower).

Next in step S430, the access request is served via the storage space allocated in the first additional memory. By using the additional memory 316 to serve the access request, the controller 322 in the storage control node 320 may directly access data in the additional memory 316 where necessary. Hence, the functionality of mirrored memories is accomplished without a need to copy data between the two storage control nodes 310 and 320.

In one embodiment of the present invention, there is further comprised: releasing a storage space associated with the access request in the first memory. Description has been presented to specific embodiments of one embodiment of the present invention with reference to FIG. 4. Since in the above step S420 data associated with the access request is written to the additional memory, the corresponding storage space in the first memory may be released. Continue the above example in FIG. 3, suppose an address range in the memory 314 for data associated with the access request is [0x00000000-0x000000FF], then the address range may be released to be allocated to other access request.

In one embodiment of the present invention, the storage system further comprises a second controller and a second memory, wherein the releasing a storage space associated with the access request in the first memory further comprises: invalidating the storage space associated with the access request in the first memory; synchronizing metadata associated with the invalidated storage space to the second memory so as to notify the second controller.

Note since the first memory and the second memory are a pair of mirrored memories in the context of the present invention, usage situation of storage spaces in the first memory must be mapped to the second memory. Continue the foregoing example, after data within the address range [0x00000000-0x000000FF] is invalidated, the second memory must be notified of associated metadata. In this embodiment, each storage page in the memory may have associated metadata. In different technical solutions, different data structures may be defined to describe metadata. For example, Table 1 schematically shows the definition of metadata according to one embodiment below.

TABLE 1

Data Structure of Metadata struct pageReference
{
   elementKey;
   lock;
   directoryLunAndIndex;
   dirtyBits;
}

In the data structure shown in Table 1, elementKey is used for recording a location of a storage page in a memory, lock is used for recording whether the storage page is locked, directoryLunAndIndex is used for recording LUN ID and location on the storage device, and dirtyBits is used for recording whether the storage page is dirty and which portion is dirty. Note Table 1 just schematically shows one example of metadata, and those skilled in the art may define other data structures as specific application environments demand.

In one embodiment of the present invention, the storage system further comprises a second additional memory coupled to the first controller, and the first additional memory and the second memory are coupled to the second controller.

Figure 5:
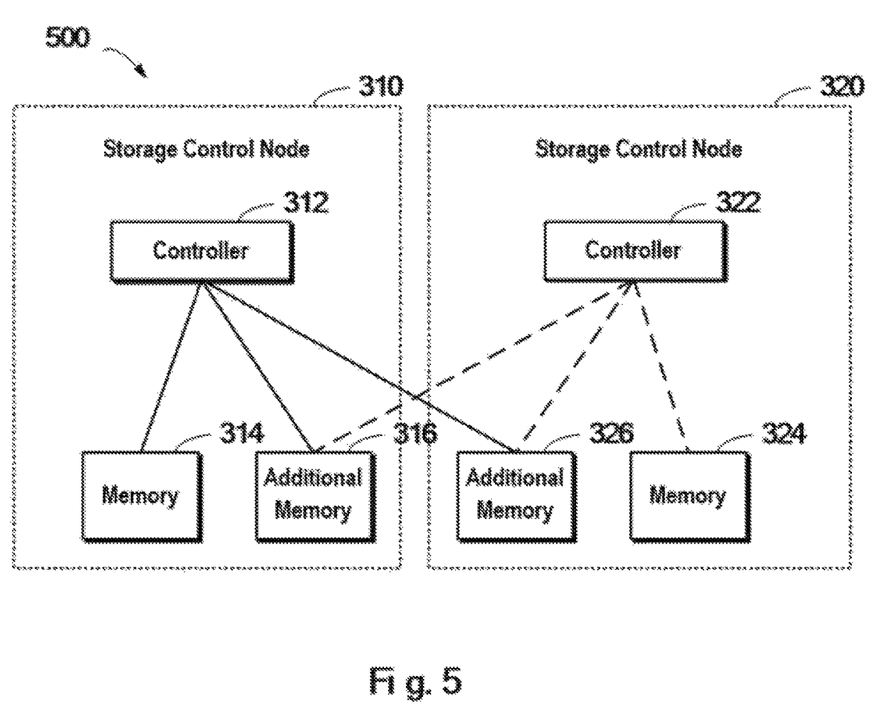
FIG. 5 schematically illustrates a schematic view of a technical solution where controllers in a storage system access memories, according to one embodiment of the present invention.

FIG. 5 shows a schematic view 500 of a technical solution where controllers in a storage system access memories, according to one embodiment of the present invention. As shown in FIG. 5, in the storage system the controllers 312 and 322 may access different memory resources. For example, as indicated by solid lines in FIG. 5, in the storage control node 310, the controller 312 may access the memory 314 and the additional memories 316 (the memory 314 and the additional memory 316 may be located, for example, in the storage control node where the controller 312 is in) and 326. For another example, as indicated by dashed lines in FIG. 5, in the storage control node 320 the controller 322 may access the memory 324 and the additional memories 326 (the memory 324 and the additional memory 326 may be located in, for example, the storage control node where the controller 322 is in) and 316.

In this way, either of the controllers 312 and 322 may access the additional memory 316 and the additional memory 326. Hence, when either of the controllers (e.g., the controller 312) receives an access request, by causing the additional memory 316 or the additional memory 326 to serve the access request, the other controller (e.g., the controller 322) may access data associated with the access request without a need to execute data copy between the two storage control nodes.

In one embodiment of the present invention, there is further comprised: in response to a second access request on the storage system from the second controller hitting the first additional memory, serving the second access request via a storage space associated with the second access request in the first additional memory.

With reference to FIG. 5, when the controller 322 receives an access request for accessing a certain address in the storage device, the controller 322 may learn, by querying the metadata, whether the access request hits the additional memory 316, 326 or the memory 324. When the access request hits the memory 324, operation may be performed using the method described with reference to FIG. 4 above, and details are omitted here. When the access request hits the additional memory 316, the access request may be served via a storage space associated with the access request in the additional memory 316. Under the architecture shown in FIG. 5, since the additional memories 316 and 326 are peers, when the access request hits the additional memory 326, the access request may be served via a storage space associated with the access request in the additional memory 326.

In one embodiment of the present invention, since the architecture shown in FIG. 5 is symmetric, various methods that are described by taking the storage control node 310 as the execution body may be executed by the storage control node 320 throughout the context of the present invention.

Description has been presented above to the situation where the access request hits the first memory. In real application environments, there may further arise a situation where the access request misses the first memory. In this case, the additional memory 316 may be used to respond to the access request in order to leverage the additional memory to serve the access request as much as possible and further avoid data copy between ordinary memories (e.g., the memories 314 and 324 in FIG. 5) in two storage control nodes.

In one embodiment of the present invention, there is further comprised: in response to the access request missing the first memory, allocating a storage space in the first additional memory, and serving the access request via the storage space allocated in the first additional memory.

Still with reference to FIG. 5, suppose the controller 312 receives an access request and the access request misses the memory 314, and then at this point a storage space may be allocated in either of the additional memories 316 and 326 that are accessible to the controller 312, so as to serve the access request. Considering that both the additional memory 316 and the controller 312 are located in the storage control node 310 and the speed of the controller 312 accessing the additional memory 316 might be faster than its speed of accessing the additional memory 326, preferentially a storage space may be allocated in the additional memory 316. Alternatively, a storage space may further be allocated in the additional memory 326. Although the response of the additional memory 326 to the access request might be slower than that of the additional memory 316 to the access request, since data copy between the memories 314 and 324 is avoided, the wait time is decreased to some extent.

Figure 6:
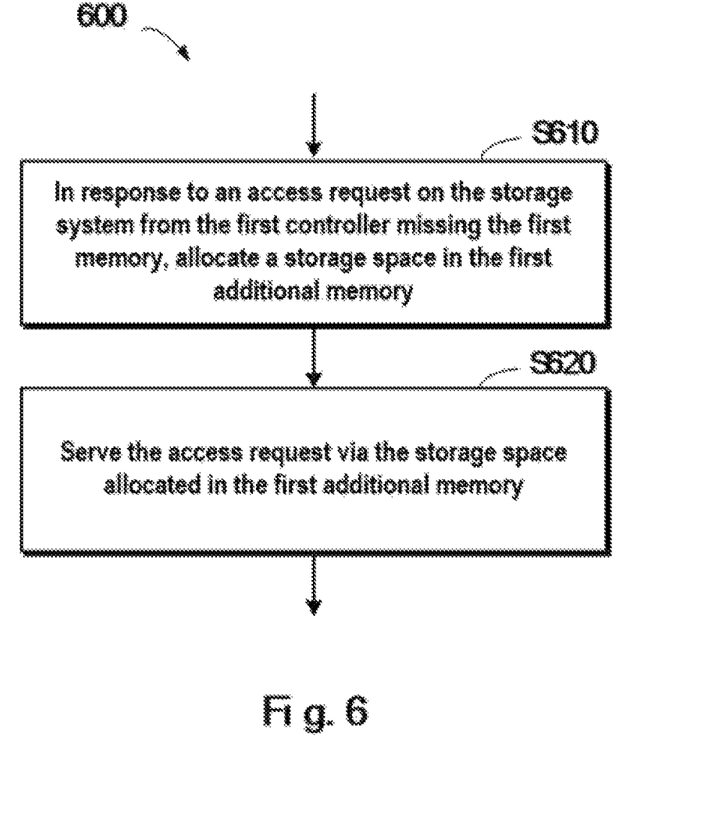
FIG. 6 schematically illustrates a flowchart of a method for managing a memory in a storage system according to one embodiment of the present invention.

FIG. 6 schematically shows a flowchart 600 of a method for managing a memory in a storage system according to one embodiment of the present invention. First of all, in step S610 it is determined whether an access request from the first controller hits the first memory, and in the situation of missing, a storage space is allocated in the first additional memory. In this step, a desired number of storage spaces that meet the access request may be allocated from available spaces in the first additional memory. Next in step S620, the access request is served via the storage space allocated in the first additional memory.

In one embodiment of the present invention, the storage system further comprises a second controller and a second memory, and the method further comprises: synchronizing metadata associated with the storage space allocated in the first additional memory to the second memory so as to notify the second controller.

In this embodiment, since the second controller also wants to know information on the storage space allocated in the first additional memory, after it is determined that the access request is served via the storage space allocated in the first additional memory, the second controller has to be notified of metadata associated with the allocated storage space. The metadata in this embodiment may be stored in a mode similar to the data structure described in Table 1 above. Alternatively, those skilled in the art may further use other data structures to save metadata.

Figure 7:
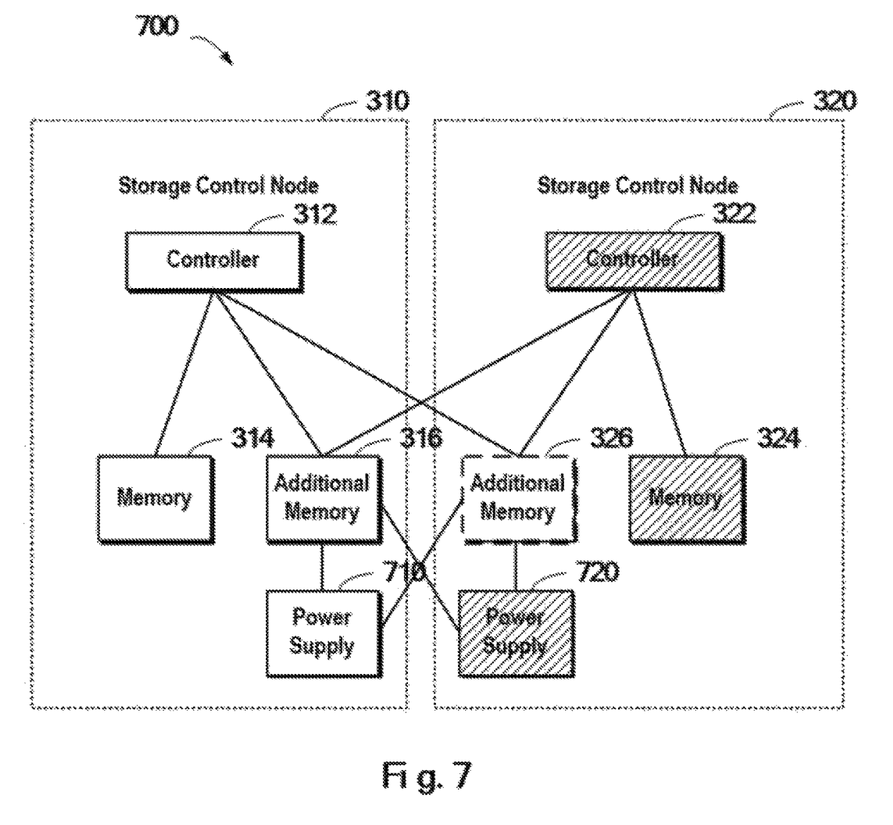
FIG. 7 schematically illustrates an architecture view for managing a memory in a storage system according to one embodiment of the present invention.

FIG. 7 schematically shows an architecture view 700 of managing a memory in a storage system according to one embodiment of the present invention. As shown in FIG. 7, the additional memory 316 may be connected to a local power supply 710 and may further be connected to a voltage 720 of the storage control node 320. Further, the additional memory 326 may be connected to a local power supply 720 and may further be connected to the power supply 710 of the storage control node 310. In this way, when either of the two storage control nodes 310 and 320 fails, the additional memory in a failing storage control node may be supplied by the power supply in a normal storage control node. Therefore, the normal storage control node may continue accessing the additional memory in the failing storage control node. With reference to FIG. 7, suppose the storage control node 320 fails, and then at this point none of the controller 322, the memory 324 and the power supply 720 that are shown in shadow in the storage control node 320 cannot be used normally, whereas the additional memory 326 still can be normally used under the supply from the power supply 710.

Description is presented below to concrete steps that are taken to handle an access request when one storage control node fails. In one embodiment of the present invention, there is further comprised: in response to the second controller failing, receiving, via the first controller, an access request on the storage system; and in response to the access request missing, allocating a storage space in the first memory to respond to the access request.

Hereinafter, specific operations of the storage system are described by taking a read request as an example. With reference to FIG. 7, when the storage control node 320 fails, the storage control node 310 may continue operating normally and handle an access request from an external host. When the controller 312 receives a read request, it is determined whether the read request hits various memories (e.g., the memory 314, the additional memory 316 and the additional memory 326) that are accessible to the controller 312. If the read request misses any of these memories, then a storage space is allocated in the additional memory 316 to respond to the read request. Alternatively, since the additional memory 326 is also in normal operating state, further a storage space may be allocated in the additional memory 326 to respond to the read request.

In one embodiment of the present invention, there is further comprised: in response to the second controller failing, receiving, via the first controller, a write request on the storage system; in response to the write request missing the first memory, allocating a storage space in the first additional memory; writing the write request associated with the write request in the first additional memory to the storage space allocated in the first additional memory; and serving the write request via the storage space allocated in the first additional memory.

In this embodiment, like the method described with reference to FIG. 4 above, when the controller 312 receives a write request, first it may be judged whether the write request hits various memories (e.g., the memory 314, the additional memory 316 and the additional memory 326) that are accessible to the controller 312. In response to the write request hitting the memory 314, a storage space is allocated in the additional memory 316, data associated with the write request in the memory 314 is written to the additional memory 316, and the write request is served via the storage space allocated in the additional memory 316.

Since the controller 314 may simultaneously access the additional memory 316 and the additional memory 326, alternatively in response to the write request hitting the memory 314, a storage space is allocated in the additional memory 326, data associated with the write request in the memory 314 is written to the additional memory 326, and the write request is served via the storage space allocated in the additional memory 326.

In one embodiment of the present invention, there is further comprised: in response to the second controller failing, receiving, via the first controller, a write request on the storage system; and in response to the write request missing, allocating a storage space in the first additional memory to serve the write request. Still with reference to FIG. 7, when it is determined the write request received by the controller 312 misses any of the memory 314, the additional memory 316 and the additional memory 326, the write request may be served by the additional memory 316 (or 326).

Note with reference to FIG. 7, description has been presented with above to the situation where only the storage control node 320 fails. When the storage control node 310 in FIG. 7 fails, those skilled in the art may implement, based on the principles described herein, a concrete embodiment that the storage control node 320 receives and handles an access request from an external host.

Figure 8:
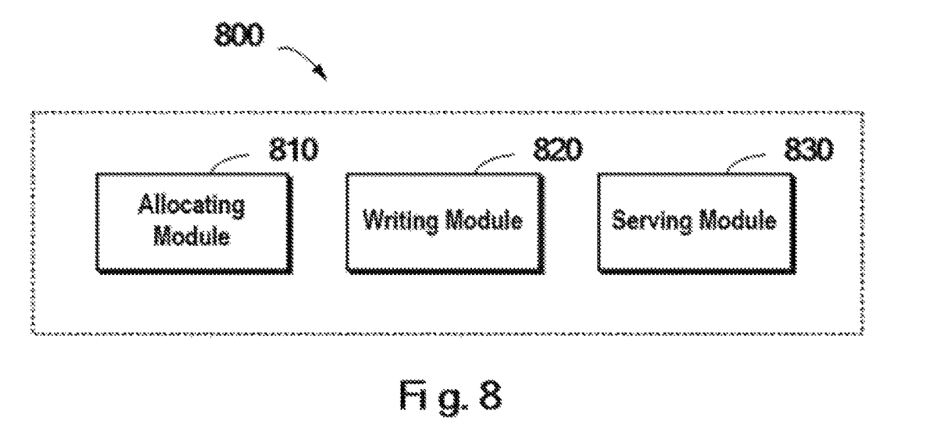
FIG. 8 schematically illustrates a block diagram of an apparatus for managing a memory in a storage system according to one embodiment of the present invention.

FIG. 8 schematically shows a block diagram of an apparatus for managing a memory in a storage system according to one embodiment of the present invention. As shown in FIG. 8, there is proposed an apparatus for managing a memory in a storage system. The storage system comprises a first controller, a first memory and a first additional memory that is coupled to the first controller, and the apparatus comprises: an allocating module 810 configured to, in response to an access request on the storage system from the first controller hitting the first memory, allocate a storage space in the first additional memory; a writing module 820 configured to write data associated with the access request in the first memory to the storage space allocated in the first additional memory; and a serving module 830 configured to serve the access request via the storage space allocated in the first additional memory.

In one embodiment of the present invention, there is further comprised: a releasing module configured to release a storage space associated with the access request in the first memory.

In one embodiment of the present invention, the storage system further comprises a second controller and a second memory, wherein the releasing module comprises: an invalidating module configured to invalidate a storage space associated with the access request in the first memory; and a synchronizing module configured to synchronize metadata associated with the invalidated storage space to the second memory so as to notify the second controller.

In one embodiment of the present invention, the allocating module is further configured to, in response to the access request missing the first memory, allocate a storage space in the first additional memory; and the serving module is further configured to serve the access request via the storage space allocated in the first additional memory.

In one embodiment of the present invention, the storage system further comprises a second controller and a second memory, and the apparatus further comprises: a notifying module configured to synchronize metadata associated with the storage space allocated in the first additional memory to the second memory so as to notify the second controller.

In one embodiment of the present invention, the serving module 830 is further configured to: in response to a second access request on the storage system from the second controller hitting the first additional memory, serve the second access request via a storage space associated with the second access request in the first additional memory.

In one embodiment of the present invention, there is further comprised: a troubleshooting module configured to, in response to the second controller failing, receive an access request on the storage system via the first controller; and the allocating module 810 is further configured to, in response to the access request missing, allocate a storage space in the first memory so as to respond to the access request.

In one embodiment of the present invention, there is further comprised: a troubleshooting module configured to, in response to the second controller failing, receive a write request on the storage system via the first controller; and the allocating module 810 is further configured to, in response to the write request missing the first memory, allocate a storage space in the first additional memory; the writing module 820 is further configured to write data associated with the write request in the first memory to the storage space allocated in the first additional memory; and the serving module 830 is further configured to serve the write request via the storage space allocated in the first additional memory.

In one embodiment of the present invention, there is further comprised: a troubleshooting module configured to, in response to the second controller failing, receive a write request on the storage system via the first controller; and the allocating module is further configured to, in response to the write request missing, allocate a storage space in the first additional memory so as to serve the write request.

In one embodiment of the present invention, the storage system further comprises a second additional memory coupled to the first controller, and both the first additional memory and the second additional memory are coupled to the second controller.

In one embodiment of the present invention, there is provided a system for managing a memory in a storage system comprising: one or more processors; a memory coupled to at least one processor of the one or more processors; computer program instructions stored in the memory which, when executed by the at least one processor, cause the system to execute a method for managing a memory in a storage system. The method comprises: in a storage system comprising a first controller, a first memory and a first additional memory that is coupled to the first controller, in response to an access request on the storage system from the first controller hitting the first memory, allocating a storage space in the first additional memory; writing data associated with the access request in the first memory to the storage space allocated in the first additional memory; and serving the access request via the storage space allocated in the first additional memory.

In one embodiment of the present invention, the computer program instructions, when executed by the at least one processor, further cause the system to: release a storage space associated with the access request in the first memory.

In one embodiment of the present invention, the storage system further comprises a second controller and a second memory, wherein the computer program instructions, when executed by the at least one processor, further cause the system to: invalidate a storage space associated with the access request in the first memory; and synchronize metadata associated with the invalidated storage space to the second memory so as to notify the second controller.

In one embodiment of the present invention, the computer program instructions, when executed by the at least one processor, further cause the system to: in response to the access request missing the first memory, allocate a storage space in the first additional memory; and serve the access request via the storage space allocated in the first additional memory.

In one embodiment of the present invention, the storage system further comprises a second controller and a second memory, and the computer program instructions, when executed by the at least one processor, further cause the system to: synchronize metadata associated with the storage space allocated in the first additional memory to the second memory so as to notify the second controller.

In one embodiment of the present invention, the computer program instructions, when executed by the at least one processor, further cause the system to: in response to a second access request on the storage system from the second controller hitting the first additional memory, serve the second access request via a storage space associated with the second access request in the first additional memory.

In one embodiment of the present invention, the computer program instructions, when executed by the at least one processor, further cause the system to: in response to the second controller failing, receive an access request on the storage system via the first controller, and in response to the access request missing, allocate a storage space in the first memory so as to respond to the access request.

In one embodiment of the present invention, the computer program instructions, when executed by the at least one processor, further cause the system to: in response to the second controller failing, receive a write request on the storage system via the first controller; in response to the write request missing the first memory, allocate a storage space in the first additional memory; write data associated with the write request in the first memory to the storage space allocated in the first additional memory; and serve the write request via the storage space allocated in the first additional memory.

In one embodiment of the present invention, the computer program instructions, when executed by the at least one processor, further cause the system to: in response to the second controller failing, receive a write request on the storage system via the first controller; and in response to the write request missing, allocate a storage space in the first additional memory so as to serve the write request.

In one embodiment of the present invention, the storage system further comprises a second additional memory coupled to the first controller, and both the first additional memory and the second additional memory are coupled to the second controller.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a memory in a storage system, the storage system comprising a first controller, a first memory that is coupled to the first controller, a second controller, a second memory that is coupled to the second controller, and a first additional memory that is coupled to the first controller and the second controller, the method comprising:

in response to an access request on the storage system from the first controller hitting the first memory, allocating a storage space in the first additional memory;

writing data associated with the access request in the first memory to the storage space allocated in the first additional memory; and serving the access request via the storage space allocated in the first additional memory, wherein serving the access request via the storage space allocated in the first additional memory includes providing simultaneous access to the data associated with the access request to each of the first controller and the second controller via the first additional memory.

2. The method according to claim 1, further comprising: releasing a storage space associated with the access request in the first memory.

3. The method according to claim 2, wherein the releasing a storage space associated with the access request in the first memory further comprises:
invalidating a storage space associated with the access request in the first memory; and
synchronizing metadata associated with the invalidated storage space to the second memory, so as to notify the second controller.

4. The method according to claim 1, further comprising:
in response to the access request missing the first memory, allocating a storage space in the first additional memory; and
serving the access request via the storage space allocated in the first additional memory.

5. The method according to claim 1, wherein the method further comprises:
synchronizing metadata associated with the storage space allocated in the first additional memory to the second memory, so as to notify the second controller.

6. The method according to claim 5, further comprising:
in response to a second access request on the storage system from the second controller hitting the first additional memory, serving the second access request via a storage space associated with the second access request in the first additional memory.

7. The method according to claim 5, further comprising:
in response to the second controller failing, receiving an access request on the storage system via the first controller; and
in response to the access request missing, allocating a storage space in the first memory so as to respond to the access request.

8. The method according to claim 5, further comprising:
in response to the second controller failing, receiving a write request on the storage system via the first controller;
in response to the write request missing the first memory, allocating a storage space in the additional first memory;
writing data associated with the write request in the first memory to the storage space allocated in the first additional memory; and
serving the write request via the storage space allocated in the first additional memory.

9. The method according to claim 5, further comprising:
in response to the second controller failing, receiving a write request on the storage system via the first controller; and
in response to the write request missing, allocating a storage space in the first memory so as to serve the write request.

10. The method according to claim 5, wherein the storage system further comprises a second additional memory coupled to the first controller, and both the first additional memory and the second additional memory are coupled to the second controller.

11. A system for managing a memory in a storage system, the system comprising:
one or more processors;
a memory coupled to at least one processor of the one or more processors;
computer program instructions stored in the memory which, when executed by the at least one processor, cause the system to execute a method for managing a memory in a storage system, the method comprising:
in a storage system comprising a first controller, a first memory that is coupled to the first controller, a second controller, a second memory that is coupled to the second controller, and a first additional memory that is coupled to the first controller and the second controller, in response to an access request on the storage system from the first controller hitting the first memory, allocating a storage space in the first additional memory;
writing data associated with the access request in the first memory to the storage space allocated in the first additional memory; and
serving the access request via the storage space allocated in the first additional memory, wherein serving the access request via the storage space allocated in the first additional memory includes providing simultaneous access to the data associated with the access request to each of the first controller and the second controller via the first additional memory.

12. The system according to claim 11, wherein the computer program instructions, when executed by the at least one processor, further cause the system to:
release a storage space associated with the access request in the first memory.

13. The system according to claim 12, wherein the computer program instructions, when executed by the at least one processor, further cause the system to:
invalidate a storage space associated with the access request in the first memory; and
synchronize metadata associated with the invalidated storage space to the second memory, so as to notify the second controller.

14. The system according to claim 11, wherein the computer program instructions, when executed by the at least one processor, further cause the system to:
in response to the access request missing the first memory, allocate a storage space in the first additional memory; and
serve the access request via the storage space allocated in the first additional memory.

15. The system according to claim 11, wherein the computer program instructions, when executed by the at least one processor, further cause the system to:
synchronize metadata associated with the storage space allocated in the first additional memory to the second memory, so as to notify the second controller.

16. The system according to claim 15, wherein the computer program instructions, when executed by the at least one processor, further cause the system to:
in response to a second access request on the storage system from the second controller hitting the first additional memory, serve the second access request via a storage space associated with the second access request in the first additional memory.

17. The system according to claim 15, wherein the computer program instructions, when executed by the at least one processor, further cause the system to:
in response to the second controller failing, receive an access request on the storage system via the first controller; and
in response to the access request missing, allocate a storage space in the first memory so as to respond to the access request.

18. The system according to claim 15, wherein the computer program instructions, when executed by the at least one processor, further cause the system to:
- in response to the second controller failing, receive a write request on the storage system via the first controller;
- in response to the write request missing the first memory, allocate a storage space in the first additional memory;
- write data associated with the write request in the first memory to the storage space allocated in the first additional memory; and
- serve the write request via the storage space allocated in the first additional memory.

19. The system according to claim 15, wherein the computer program instructions, when executed by the at least one processor, further cause the system to:
- in response to the second controller failing, receive a write request on the storage system via the first controller; and
- in response to the write request missing, allocate a storage space in the first additional memory so as to serve the write request.

20. The system according to claim 15, wherein the storage system further comprises a second additional memory coupled to the first controller, and both the first additional memory and the second additional memory are coupled to the second controller.

* * * * *